United States Patent
Rao et al.

(10) Patent No.: US 8,929,888 B2
(45) Date of Patent: Jan. 6, 2015

(54) OPTIMIZED SYSTEM SELECTION USING LOCATION ESTIMATION

(75) Inventors: Bharath Narasimha Rao, San Jose, CA (US); Madhusudan Chaudhary, Sunnyvale, CA (US); Karthik Anantharaman, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 224 days.

(21) Appl. No.: 13/110,836

(22) Filed: May 18, 2011

(65) Prior Publication Data

US 2012/0129487 A1 May 24, 2012

Related U.S. Application Data

(60) Provisional application No. 61/417,067, filed on Nov. 24, 2010, provisional application No. 61/417,072, filed on Nov. 24, 2010, provisional application No. 61/417,074, filed on Nov. 24, 2010.

(51) Int. Cl.
*H04W 4/00* (2009.01)
*H04W 64/00* (2009.01)
*H04W 4/02* (2009.01)
*H04W 48/16* (2009.01)

(52) U.S. Cl.
CPC ............. *H04W 64/00* (2013.01); *H04W 4/021* (2013.01); *H04W 48/16* (2013.01)
USPC ...................... 455/434; 455/456.1; 455/404.2

(58) Field of Classification Search
USPC .................................... 455/432.1, 456.1, 450
See application file for complete search history.

(56) References Cited

U.S. PATENT DOCUMENTS

| | | | |
|---|---|---|---|
| 5,900,838 A | 5/1999 | Khan et al. | |
| 6,134,438 A | 10/2000 | Sawyer | |
| 6,564,055 B1 | 5/2003 | Hronek | |
| 7,260,394 B2 | 8/2007 | Welnick et al. | |
| 7,277,703 B2 | 10/2007 | Saglam et al. | |
| 7,756,525 B1 | 7/2010 | Thomas et al. | |
| 7,797,000 B2 | 9/2010 | Anderson | |
| 7,822,426 B1 * | 10/2010 | Wuersch | 455/456.1 |
| 7,933,612 B2 | 4/2011 | Counts et al. | |

(Continued)

OTHER PUBLICATIONS

Office Action mailed Aug. 15, 2013 in U.S. Appl. No. 13/110,835, 24 pages.

(Continued)

*Primary Examiner* — Vladimir Magloire
*Assistant Examiner* — Shantell L Heiber
(74) *Attorney, Agent, or Firm* — Kilpatrick Townsend & Stockton LLP

(57) ABSTRACT

A current location of a mobile system in a wireless network can be determined by using information provided by a base station in communication with the mobile system. The information can include a system identifier (SID) table and a local time offset (LTM_OFF) value and a daylight savings time (DAYLT) value. The SID table is used to provide a mobile country code (MCC) associated with a country in which the mobile device is located. The LTM_OFF value is used to provide a range of longitude values in which the mobile device is located. The current location of the mobile device is based upon at least the range of longitude values and the current country. The current location is used to build an optimized scan list that is used, in turn, to identify and acquire access to the preferred system by a mobile device.

26 Claims, 14 Drawing Sheets

(56) References Cited

U.S. PATENT DOCUMENTS

| | | |
|---|---|---|
| 2002/0149515 A1 | 10/2002 | Alanen et al. |
| 2004/0076130 A1* | 4/2004 | Uchida et al. ............... 370/335 |
| 2004/0104841 A1* | 6/2004 | Syrjarinne ............... 342/357.13 |
| 2004/0203880 A1 | 10/2004 | Riley |
| 2005/0185620 A1 | 8/2005 | Cheon |
| 2005/0208936 A1 | 9/2005 | Sumcad et al. |
| 2006/0079224 A1* | 4/2006 | Welnick et al. ............ 455/432.1 |
| 2006/0217130 A1* | 9/2006 | Rowitch et al. ............ 455/456.1 |
| 2007/0142046 A1 | 6/2007 | Welnick |
| 2007/0197211 A1* | 8/2007 | Lee et al. ................... 455/432.1 |
| 2008/0051100 A1 | 2/2008 | Kruys et al. |
| 2008/0102825 A1 | 5/2008 | Joo |
| 2008/0146202 A1 | 6/2008 | Krause |
| 2009/0088152 A1 | 4/2009 | Orlassino |
| 2009/0286549 A1 | 11/2009 | Canon et al. |
| 2009/0325594 A1 | 12/2009 | Lan et al. |
| 2010/0035613 A1 | 2/2010 | Schroter |
| 2010/0099406 A1 | 4/2010 | Anantharaman et al. |
| 2010/0246468 A1 | 9/2010 | Santhanam et al. |
| 2011/0096697 A1 | 4/2011 | Anantharaman et al. |
| 2012/0129520 A1 | 5/2012 | Rao et al. |
| 2012/0129548 A1 | 5/2012 | Rao et al. |

OTHER PUBLICATIONS

Notice of Allowance mailed Mar. 31, 2014 in U.S. Appl. No. 13/110,840, 19 pages.

Office Action mailed Feb. 5, 2014 in U.S. Appl. No. 13/110,835, 27 pages.

Office Action mailed Jul. 3, 2013 in related U.S. Appl. No. 13/110,840, 22 pages.

* cited by examiner

GEO Locate Table

| SID | GEO$_{locate}$ | dev_loc |
|---|---|---|
| SID1 | new | dev_loc1 |
| SID2 | same | dev_loc1 |
| SID3 | same | dev_loc1 |
| SID4 | new | dev_loc2 |
| SID5 | new | dev_loc3 |

SIDs ← | Relationship to GEO$_{system}$ ← | GEO location ←

OPTIMIZED SYSTEM SELECTION USING LOCATION ESTIMATION

CROSS REFERENCE TO RELATED APPLICATIONS

This patent application takes priority under 35 U.S.C. 119(e) of the following U.S. Provisional Patent Applications entitled:
  (i) GEO TAGGING USING LOCATION ESTIMATION by Rao et. al. having Ser. No. 61/417,067 filed Nov. 24, 2010 that is incorporated by reference in its entirety for all purposes;
  (ii) OPTIMIZED SYSTEM SELECTION USING LOCATION ESTIMATION by Rao et. al. having Ser. No. 61/417,072 filed Nov. 24, 2010 that is incorporated by reference in its entirety for all purposes; and
  (iii) LOCATION ESTIMATION by Rao et. al. having Ser. No. 61/417,074 filed Nov. 24, 2010 that is incorporated by reference in its entirety for all purposes.

This patent application is related to the following co-pending U.S. patent applications each of which are incorporated by reference in their entireties for all reasons:
  (i) U.S. patent application Ser. No. 13/110,835 entitled "LOCATION ESTIMATION", by Rao et. al. filed May 18, 2011; and
  (ii) U.S. patent application Ser. No. 13/110,840 entitled "GEO TAGGING USING LOCATION ESTIMATION", by Rao et. al. filed May 18, 2011.

TECHNICAL FIELD

The embodiments described herein relate generally to the field of wireless communication. In particular, using location estimation to provide improved carrier selection by a mobile system in a wireless network is described.

BACKGROUND

Wireless communication networks are widely deployed to provide various communication services, such as voice, video, packet data, messaging, broadcast, etc. These wireless networks may be multiple-access networks capable of supporting communication for multiple users by sharing the available network resources. Examples of such multiple-access networks include Code Division Multiple Access (CDMA) networks, Time Division Multiple Access (TDMA) networks, Frequency Division Multiple Access (FDMA) networks, and Orthogonal FDMA (OFDMA) networks.

It is often desirable, and sometimes necessary, to know the location of a terminal in a wireless network. The terms "location" and "position" are synonymous and are used interchangeably herein. For example, a user may utilize the terminal to browse websites and may click on location sensitive content. The location of the terminal may then be determined and used to provide appropriate content to the user. There are many other scenarios in which knowledge of the location of the terminal is useful or necessary.

Various positioning methods may be used to determine the location of a terminal. Each positioning method may use certain information and may require certain capabilities at the terminal and/or a location server in order to compute a location estimate for the terminal. It is desirable to support positioning in an efficient manner in order to conserve resources and reduce delay.

Using efficient location estimation to reduce an amount of time required to identify an appropriate carrier for a mobile system (MS) that can also reduce an amount of power consumed.

SUMMARY OF THE DESCRIBED EMBODIMENTS

Other apparatuses, methods, features and advantages of the described embodiments will be or will become apparent to one with skill in the art upon examination of the following figures and detailed description. It is intended that all such additional apparatuses, methods, features and advantages be included within this description be within the scope of and protected by the accompanying claims.

A method performed in a wireless communication network can be carried out by receiving information corresponding to a location of a mobile system, using the location information to identify a preferred system, and acquiring service associated with the preferred system.

In one aspect, the preferred system is identified by accessing a tagged GEO Locate Table that includes at least one GEO tagged with corresponding location information, indexing the tagged GEO Locate Table with the location information corresponding to the acquired service, and identifying the preferred system in accordance with the indexing. The GEO Locate Table includes at least a system identifier (SID), a corresponding GEO identifier, a device location, a channel number, and a Preferred Roaming List (PRL) indicator indicating that the SID is provisioned in a PRL stored in the mobile system.

A wireless mobile system includes at least a wireless interface, the wireless interface configured for wirelessly communication with a wireless base station, a memory device arranged to store data, the data including at least a preferred roaming list (PRL), and a processor coupled to the wireless interface and the memory device, the processor arranged to acquire access to a preferred system by, receiving information corresponding to a location of a mobile system, using the location information to identify a preferred system, and acquiring service associated with the preferred system.

Non-transitory computer readable medium executable by a processor in a mobile system for establishing a communication channel between the mobile system and a base station in a wireless communication network includes at least computer code for computer code for receiving information corresponding to a location of a mobile system, computer code for using the location information to identify a preferred system, and computer code for acquiring service associated with the preferred system.

A wireless network includes a base station and a mobile system. In the described embodiments, the mobile system determines a current location of the mobile system by receiving information corresponding to a location of a mobile system, using the location information to identify a preferred system, and acquiring service associated with the preferred system

BRIEF DESCRIPTION OF THE DRAWINGS

The described embodiments and the advantages thereof can best be understood by reference to the following description taken in conjunction with the accompanying drawings.

FIG. 3 shows GEO Locate Table in accordance with the described embodiments.

DETAILED DESCRIPTION OF REPRESENTATIVE EMBODIMENTS

Figure 1:
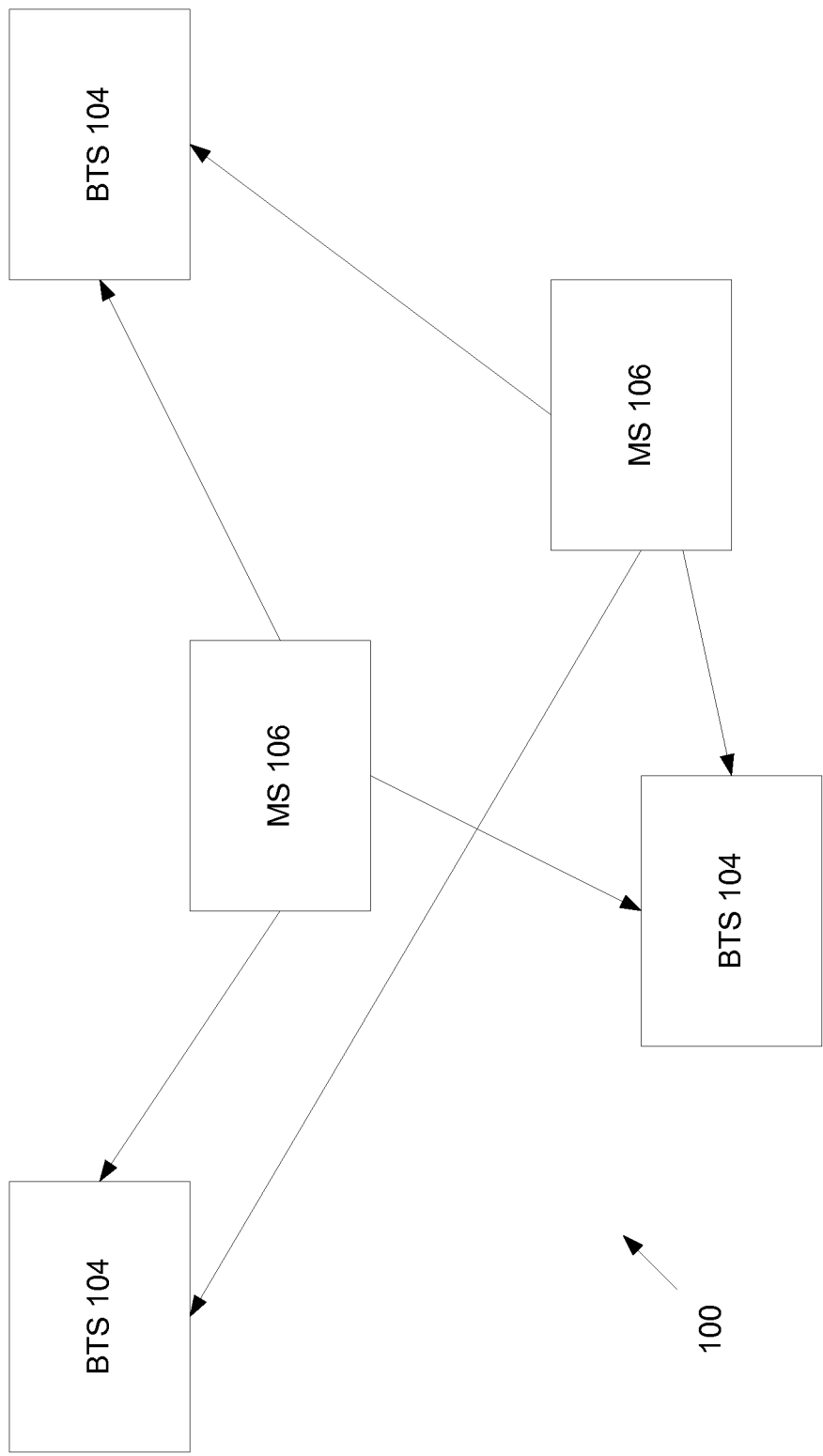
FIG. 1 is a diagram of a wireless communication system 100 according to one embodiment that supports a number of users, and which can implement various aspects of the invention.

In the following detailed description, numerous specific details are set forth to provide a thorough understanding of the concepts underlying the described embodiments. It will be apparent, however, to one skilled in the art that the described embodiments can be practiced without some or all of these specific details. In other instances, well known process steps have not been described in detail in order to avoid unnecessarily obscuring the underlying concepts.

Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity. A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), (4) the "TIA/EIA-IS-856 CDMA2000 High Rate Packet Data Air Interface Specification" (the IS-856 standard), and (5) some other standards.

Cellular communication system users commonly have a service agreement with a cellular provider. The system operated by a cellular provider may cover a limited geographical area. When a user travels outside of this geographical area, service may be provided by another system operator, under a roaming agreement. There is often more than one service provider in a particular region, so a user may have a choice as to which service provider to roam with. As cellular communication systems have proliferated, networks of cellular systems have been organized under common service providers, or with contractual agreements between service providers. Roaming fees are minimized or eliminated when a user transfers between systems which are party to such agreements. As such, modern mobile stations often make use of Preferred Roaming Lists (PRLs), which contain information about the preferred systems for roaming and various parameters needed for communication therewith. PRLs may be pre-programmed in a mobile station when service is initiated. The PRL is basically a binary file loaded in memory of the MS that allows the MS to choose a best option from all networks available in a visited area according to a strategy specified by specific roaming business rules. In particular, the PRL is a database residing in a wireless (primarily CDMA) device, such as a cell phone, that contains information used during the system selection and acquisition process. In the case of RUIM-based CDMA devices, the PRL resides on the RUIM. The PRL indicates which bands, sub bands and service provider identifiers will be scanned and in what priority order. The PRL works sequentially in that the MS scans the PRL for an allowed network from the top of the list and finishing at the bottom of the list having the potential of a long search. Without a PRL, the device may not be able to roam i.e. obtain service outside of the home area. There may be cases where missing or corrupt PRL's can lead to a customer not having service at all.

The conventional PRL consists of two tables (along with some header and overhead information) namely an acquisition table and a system table. The acquisition table can take the form of an indexed list of frequencies on which the MS may search for particular systems. The idea behind the acquisition table is to optimize the acquisition time by identifying only the frequencies that should be searched, rather than searching the entire radio frequency spectrum. Each system table entry belongs to a geographic area known as a GEO. The GEO is a logical group of systems (channel, SID, NID) provided by the carrier network and provisioned in MS. These GEOs are listed in priority order. Each system can be identified by either a system identifier/network device (SID/NID) or a GEO. The information contained in each acquisition table entry includes an index, the network type, and associated channel block. The system table on the other hand can be a prioritized list of systems that the device is permitted to access (Preferred Systems) and those that it is explicitly forbidden to access (Negative Systems).

On many networks regularly updating the PRL can be desirable if the subscriber uses the device outside the home area frequently, particularly if they do so in multiple different areas. This allows the phone to choose the best roaming carriers, particularly "roaming partners" with whom the home carrier has a cost-saving roaming agreement, rather than using non-affiliated carriers. PRL files can also be used to identify home networks along with roaming partners, thus making the PRL an actual list that determines the total coverage of the subscriber, both home and roaming coverage. However, as the number of entries in the PRL becomes greater, the time required to search and discovers a preferred carrier becomes longer. Searching large PRLs can be prohibitively expensive in both time and power consumption.

Accordingly, the embodiments described herein teach efficient techniques for determining a frequency on which a mobile system can camp, the frequency associated with a preferred carrier or roaming partner. The efficient techniques can use information received from a base station to determine a current location of the MS that can be expressed in terms of a set of approximate coordinates of the mobile system. The set of approximate coordinates can take the form of a range of latitude and longitude. In one embodiment, the information can be received from any compatible base station noted as being available. The available base stations can include those associated with a preferred or roaming partner as well as non-preferred. Moreover, information from unavailable (such as emergency) can also be used to determine the current location of the MS. The current location of the MS can then be used to tag information in the PRL provisioned in the MS. The tagged information can include tagging at least SID data. The tagged SID data can also be used to identify a corresponding GEO in terms of location data. In this way, once the current location of the MS is determined, the current location data can be used to point to the data in the tagged PRL corresponding to the current location thereby greatly reducing an amount of time and power consumed in determining an appropriate frequency on which the MS can camp.

In a particular embodiment, the current location of the MS can be determined by a location engine, the location engine executed by at least a processor in the MS. The location engine can determine the current location of the MS by at least receiving a pilot signal from a base station, the pilot signal including at least a sync channel message (SCHM), the SCHM including information indentifying a carrier in the form of of a system identifier/network identifier (SID/NID), or more simply SID. It is the information included in the SID that the MS uses to query the PRL to determine if the current SID is associated with a preferred carrier and if not is simply identified as being available. Whether or not the SID is associated with the preferred carrier or roaming partner, the information provided by the SCHM can be used to determine the approximate location of the base station. By approximate location, it is meant that a range of longitude and latitudes associated with the base station can be provided.

In order to determine the approximate location of the base station, the location engine can use a time differential between a local clock associated with the base station and a standard clock can be decoded from the SCHM. As is well known in the art, the time differential can be used to estimate a current longitude of the base station (due to the known rotational speed of the Earth and a known reference longitude, which is typically taken as 0° longitude). In a particular embodiment, the time differential can be the time differential between the local time of the base station and co-ordinate Universal Time, or UTC, also referred to as a local time offset, or more simply LTM_OFF. Determining the current longitude from the LTM_OFF can provide an estimate of the longitude of the base station (and also that of the MS) to approximately ±15 minutes. Additional geographical information can be provided from the base station in the form of Global Positioning System (GPS) based data that can provide an estimate of the current location in terms of a range of latitudes (as well as longitudes). The additional geographical data can be used to provide an estimate of a current location of the base station (and the MS) that in turn can be used to tag the SID included in the pilot signal.

Once the location engine has determined the current location of the MS, the PRL can be tagged such that device location data can be associated with a particular SID. The PRL can be tagged by, for example, adding a location table to the PRL, the location table can include device location information. The device location information can point to at least one SID entry in the PRL. Moreover, the tagged SIDs can, in turn, be used to define a corresponding GEO in terms of location data providing an efficient mechanism for providing a first GEO for scanning. In this way, the MS can use the information provided in a first scan to determine an estimate of a current geographical location of the base station (and the MS) in terms of a range of latitudes and longitudes. The estimated location information can then be used to specify those SIDs in the PRL that are associated with the current geographical location. In this way, the MS need only scan those frequencies corresponding to the current geographical location and no others in order to find an appropriate frequency on which to camp. The reduced searching can greatly reduce an amount of time and battery power required for the MS to establish a connection with a preferred carrier or roaming partner.

Moreover, GEOs provisioned in the PRL provided by a service carrier can be defined in terms of location data. The location data can then be used to quickly identify a current GEO based upon device location information generated by the location engine. Once identified as the current GEO, a precise scan list can be provided from those SIDs associated with the current GEO. The data in the scan list can be conditioned in order to reduce a number of potential scan operations. For example, in one embodiment, the scan list can be conditioned based upon a list of most recently used SIDs. In this way, the number of scans can be limited to those SIDs most likely to be appropriate. This is typically the case when a loss of signal within a local geographical area requires a new connection with the service provider be established. Since the loss of signal was likely due to local conditions, it is likely that the most recently used SID will have a high probability of being at least one of the preferred SIDs. One of the advantages of providing the current location data as a range of latitudes and longitudes is related to the possibility that a SID can straddle or be included in more than one GEO. In this way, by expressing the location data in terms of the range of latitude and longitude provides for the possibility of scanning more than one GEO thereby greatly increasing the likelihood of discover an appropriate frequency on which the MS can camp.

It should be noted that the updating of the enhanced PRL can be ongoing and dynamic in nature particularly in those cases where the user of the MS travels between a numbers of different GEOs. In this situation, the entries in the location data table corresponding to the SIDs in the GEOs may be blank (if the location has not been previously visited) or invalid having location data inconsistent with current location data. Therefore, as the user of the MS travels about, the location data incorporated into the enhanced PRL can also increase providing a dynamic and robust database.

In some cases, an entirely new SID can be encountered (or a carrier can modify and change a SID to be included in a different GEO, for example) which was not part of the original PRL. In this case, the enhanced PRL can include the new SID as part of a list of new entries data base that can be appended to the enhanced PRL. However, in this case, the list of new entries data base can be added to include a channel number associated with the new SID entry.

The PRL can include at least a SID entry, an associated GEO indicator, and location information in the form of a range of latitude and longitudes for each SID/NID pair, GEO included in the PRL. For example, in addition to the system table and the acquisition table, the PRL can include a location table. The location table can include location information in the form of a range of latitude and longitude associated with a particular SID/NID pair. This location information can be used to quickly identify a SID/NID on which the MS can camp. If a discovered system in not reflected in the PRL as a preferred system or a roaming partner, then that system can be designated as an available system. Information associated with the available system can be buffered and used as a fall back system (i.e., if it is determined that no preferred systems of roaming partners are available). However, information from the available system can be used to determine location data of the base station. The location data can then be used to update the enhanced PRL, if necessary.

These and other embodiments are discussed below with reference to FIGS. 1-11. However, those skilled in the art will readily appreciate that the detailed description given herein with respect to these figures is for explanatory purposes only and should not be construed as limiting.

FIG. 1 is a diagram of a wireless communication system 100 according to one embodiment that supports a number of users, and which can implement various aspects of the invention. System 100 may be designed to support one or more CDMA standards and/or designs (e.g., the W-CDMA standard, the IS-95 standard, the cdma2000 standard, the IS-856 standard). For simplicity, system 100 is shown to include three base stations (BTS) 104 in communication with two mobile stations (MS) 106 each of which can encompass fixed wireless applications. In the context of this discussion, the term mobile station (MS) can be used interchangeably with the terms user equipment (UE), subscriber unit (SU), subscriber station (SS), access terminal (AT), remote terminal (RT), or other corresponding terms known in the art. It should be noted that a base station and the associated coverage area are often collectively referred to as a "cell". For example, in IS-95 systems, a cell may include one or more sectors. However, in the W-CDMA specification, each sector of a base station and the sector's coverage area can be referred to as a cell. Depending on the CDMA system being implemented, MS 106 can communicate with one (or possibly more) base stations on a forward link at any given moment and with one or more base stations on a reverse link depending on whether or not the mobile station is in soft handoff. In the context of this discussion, the forward link (i.e., downlink) refers to transmission from the base station to the mobile station, and the reverse link (i.e., uplink) refers to transmission from the mobile station to the base station.

BTS 104 can dedicate a significant amount of output power to a pilot channel that can include sub-channels in the form of a sync channel that continually transmits a sync channel message (SCHM). The SCHM can contain information about the network including system identifiers (SID), network identifiers (NID) and a local time offset (LTM_OFF). As well known in the art, the local time offset indicates a difference between current time and correlated universal time, or UTC. In this way, an approximate value of a current longitude of BTS 104 (and by association MS 106) can be determined. It should be noted that time zones can be written as offset from UTC in the format ±[hh]:[mm], ±[hh][mm], or ±[hh]. So if the time being described is one hour ahead of UTC (such as the time in Berlin during the winter), the zone designator would be "+01:00", "+0100", or simply "+01". It should be noted that the offset from UTC changes with day light saving time. For example, a time offset in Chicago would be "−6:00" for the winter (Central Standard Time) and "−5:00" for the summer (Central Daylight Time). BTS 104 can also transmit base station latitude information that can take the form of a data field referred to as BASE_LAT that can convey the latitude of the BTS 104 in units of 0.25 s (econds).

Figure 2:
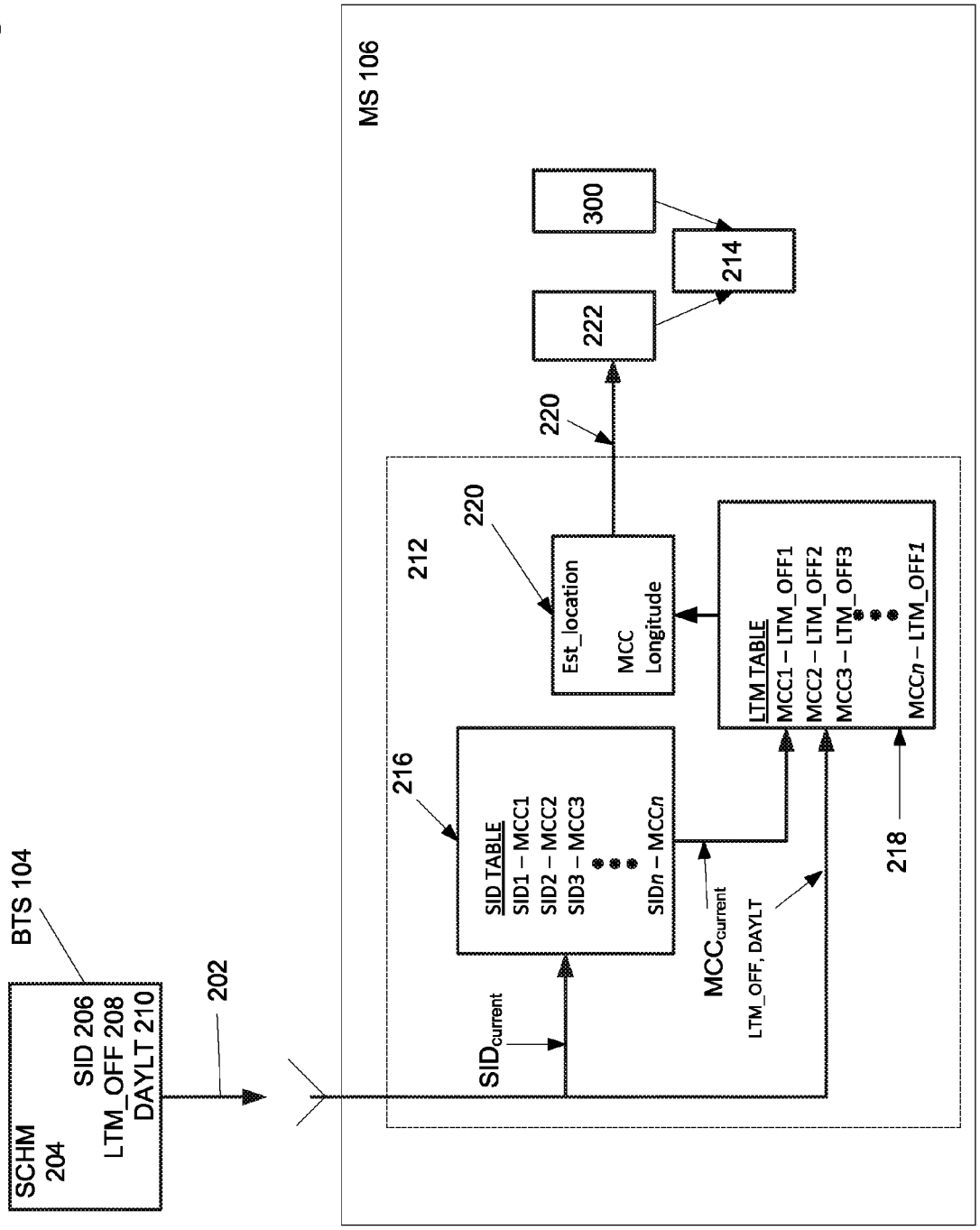
FIG. 2 shows a mobile system using BTS information to determine device location in accordance with the described embodiments.

As shown in FIG. 2, when "searching", MS 106 can find pilot signals for a wireless network by tuning to particular radio frequencies. MS 106 can receive pilot signal 202. MS 106 can listen to the sync channel associated with pilot signal 202 and decode the corresponding Sync Channel Message (SCHM) 204. SCHM 204 can include information such as (system identifier) SID 206, (local time offset) LTM_OFF 208, and (daylight savings time offset) DAYLT 210. Location engine 212 in MS 106 can use the information from the decoded SCHM (in particular values of SID 206) to compare to values of SID provisioned in PRL 214 stored in MS 106. It should be noted that the information included in SCHM 204 can be considered reliable information. In accordance with ANSI-41 Standards Technology (IFAST), any SID can be mapped to a country (MCC). In this way, a list of SIDs (referred to as SID table 216) can be sorted by SID ranges and stored in MS 106. Upon decoding SCHM 204, MS 106 can execute a table lookup to determine the country in which MS 106 is currently located. In the described embodiment, SID table 216 can be stored as an array of SIDs and corresponding Mobile Country Codes (MCC).

In some cases, a particular SID can be mapped to multiple country codes. In this case, the country code associated with the current location of MS 106 can be determined using LTM_OFF 208 and DAYLT 210. In one embodiment, LTM_OFF 208 and DAYLT 210 can be stored in MS 106 as LTM table 218. In this way, LTM_OFF 208 and DAYLT 210 received from SCHM 204 can be used to index LTM table 218 to determine the proper country code MCC in which MS 106 is currently located. In this way, LTM_OFF 208 and DAYLT 210 can be used to determine estimated current location (EST_LOC$_{current}$) 220 of BTS 104 (and MS 106). EST_LOC$_{current}$ 220 can then be used to update location table 222. By updating it is meant that the entry corresponding to SID$_{current}$ in SID table 216 can be linked with (also referred to as tagged) with location information corresponding to EST_LOC$_{current}$ 220. In this way, using location table 222 each SID entry in PRL 214 can be annotated with corresponding location data. In the described embodiment, the location data can take the form of a range of latitudes and longitudes thereby enlarging a geographical region associated with a particular SID and increasing the likelihood of a particular location matching a corresponding SID.

In some cases, MS 106 can use a paging channel (PAGECH) in which BST 104 periodically transmits a system parameter message, or SPM. The SPM can include information such as base station latitude (BASE_LAT) and base station longitude (BASE_LONG) each being associated with Global Positioning System (GPS) co-ordinates of the base station. In this way, a more precise indication in the form of an enhanced location ENH_LOC of MS 106 can be provided. In the described embodiment, the estimated location EST_LOC 220 can be used to validate the BASE_LAT and BASE_LONG information and if validated can be used to triangulate the device location (dev_loc) of MS 106 within a country (MCC) and within a range of latitude and longitude.

In order to most efficiently acquire a preferred system, a current GEO must first be identified. As well known in the art, a GEO is a logical group of systems (channel, SID, NID) provided by the carrier network and provisioned in MS 106 as the system table of PRL 214. It should be noted that each GEO can be provisioned in the system table of PRL 214 by the carrier. The system GEO can map to a physical geographical region within the carrier network's scope of operation. However, since the system GEO can be defined in terms of individual SIDs, by tagging each SID with corresponding device location information, the system GEO can also be defined in terms of device location information using the tagged SIDs as shown in FIG. 3 illustrating GEO Locate Table 300. In this way, the location GEO tagged with corresponding device location data can be used to provide a more precise scan list for MS 106 by using the device location information provided by location engine 212.

In order to provide a more effective and efficient scan search, the GEO provisioned in the system table of PRL 214 (referred to hereinafter as GEO$_{system}$) can be re-defined as a device location dependent GEO (GEO$_{locate}$) by tagging each GEO with appropriate device location data. GEO locate table 300 can be used to define a GEO using device location data, which may or may not coincide with the GEO originally provisioned in MS 106. For example, as shown in FIG. 3 GEO Locate Table 300 can include entries in which a GEO can be defined in terms of device location values (dev_loc). By tagging each GEO with corresponding device location values (EST_LOC) provided by location engine 212 can be used to quickly identify the current GEO. Once the current GEO has been identified, a more precise scan list can be provided from the SIDs associated with the identified current GEO.

Figure 4:
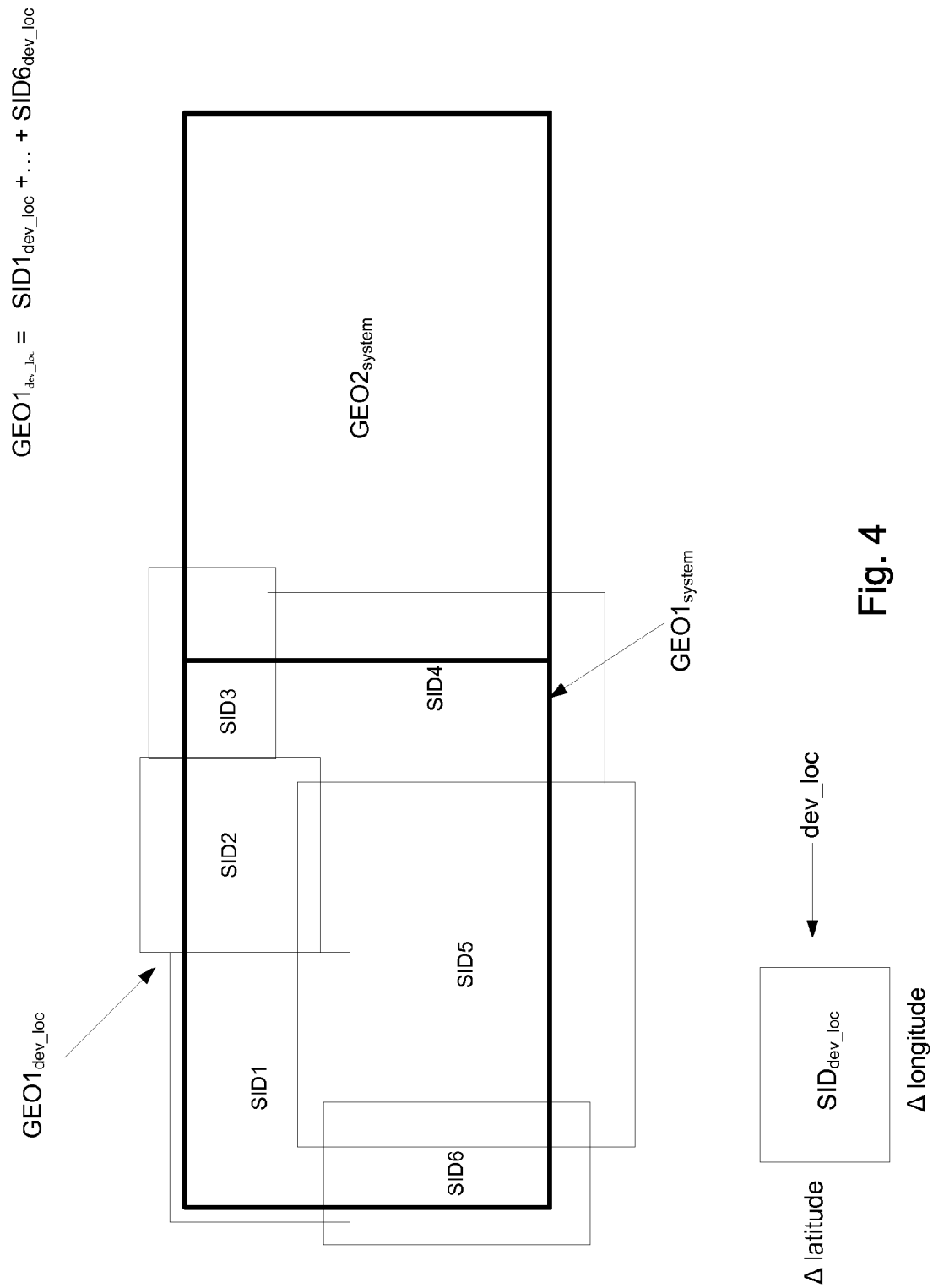
FIGS. 4-5 show tagged GEOs in accordance with described embodiments.
Figure 5:
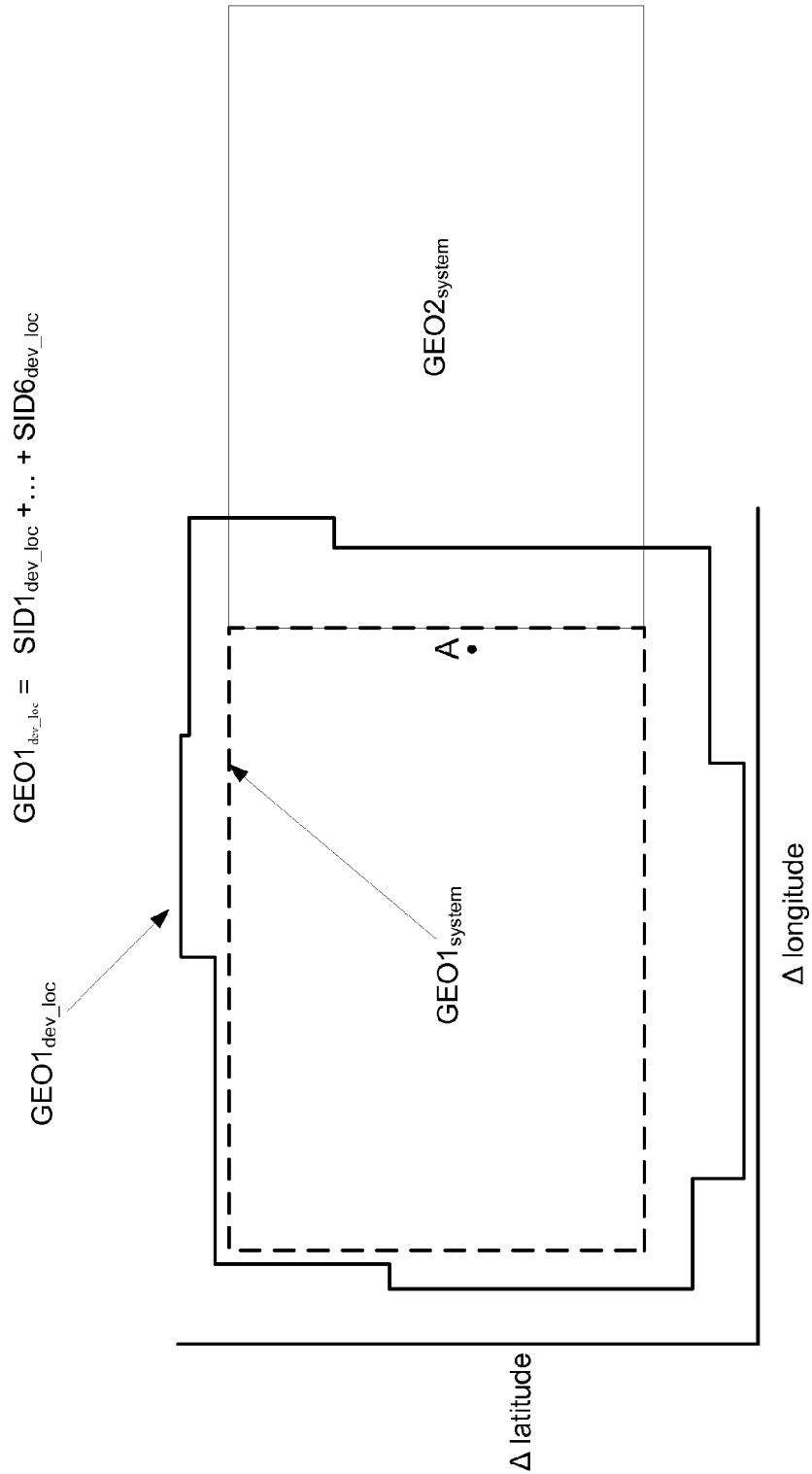
Figure 6:
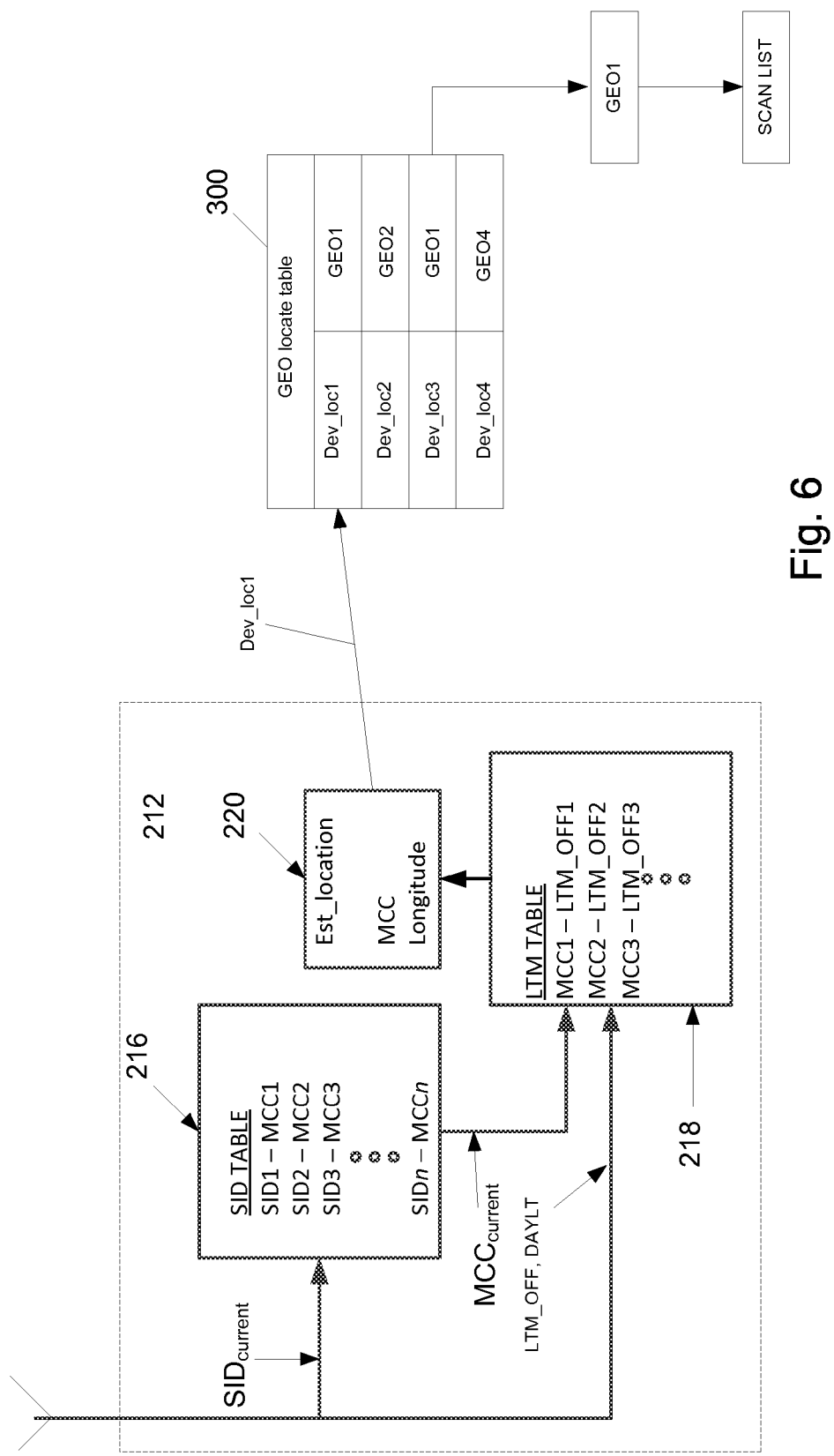
FIG. 6 shows a mobile system using device location information to identify a first GEO to scan using the GEO Locate Table.

For example, FIG. 4 shows representative system GEOs, $GEO1_{system}$ and adjacent $GEO2_{system}$ where each GEO can be defined in terms of individual SIDs. For this example, $GEO1_{system}$ is defined as SID1 through and including SID6 where SID4 and SID3 overlap $GEO1_{system}$ and $GEO2_{system}$. In this situation, if MS 106 was located in a boundary area between $GEO1_{system}$ and $GEO2_{system}$ (SID3 or SID4, for example) when losing a signal, in order to re-establish the connection, a conventionally provisioned PRL could possibly lead to MS 106 to change from $GEO1_{system}$ to $GEO2_{system}$ to start searching which can be very time consuming. However, since $GEO1_{system}$ can be defined in terms of SID1 . . . SID6, each of which can in turn be tagged with device location, $GEO1_{system}$ can also be tagged with device location data along the lines shown in FIG. 5. In this way, any device located within the range of latitude and longitude associated with $GEO1_{location}$ will use $GEO1_{location}$ as a first GEO in a search thereby substantially reducing an amount of time or power required to find a frequency on which MS 106 can camp. For example, as shown in FIG. 6, if MS 106 is located at point A near the boundary of $GEO1_{system}$ and $GEO2_{system}$, MS 106 can query GEO locate table 300 to determine that $GEO1_{locate}$ is the first GEO to scan thereby avoiding the possibility of using $GEO2_{system}$ as the first GEO to scan.

In this way, since each SID tagged with specific location data that can take the form of a range of latitude and longitude, the tagged SIDs taken together can re-define the GEO from that originally provisioned in PRL 214 using the device location information. This can be particularly advantageous in situations where MS 106 is near a boundary between two different GEOs and must re-establish the connection with the service provider. This can happen when, for example, MS 106 experiences a loss in signal in a tunnel and such. For example, if MS 106 is currently camped on SID3 in GEO1 and SID3 is included in GEO1 and GEO1, re-establishing a connection between the service provider and MS 106 can require that MS 106 change from GEO1 to GEO2 which can take a lot of time. However, using the data stored in GEO locate table 300, the current location of MS 106 can indicate that GEO1 be designated as the first GEO to scan.

Figure 7:
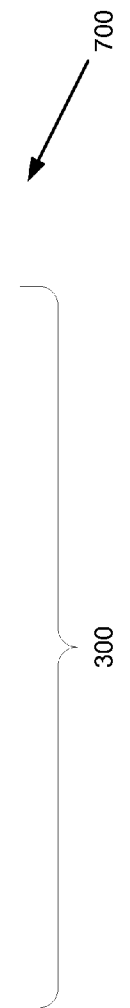
FIG. 7 shows an Extended GEO Locate Table in accordance with the described embodiments.

As shown in FIG. 7, GEO locate Table 300 can be extended to include location data for each SID and additional fields for available systems that are not provisioned in PRL 214. Location engine 212 can update GEO Locate Table 300 whenever MS 106 acquires service on a system provisioned in PRL 214. The SID of the acquired system can be tagged with the location data (dev_loc) provided by location engine 212. Tagging the SIDs can alter the GEO boundaries of MS 106 (as shown in FIG. 6). In this way, the GEO organization represented by GEO Locate Table 300 can be more specific and customized to a user than that provisioned in MS 106 by the service provider.

In some situations, a system not provisioned in PRL 214 on which MS 106 is able to successfully camp and originate a call can also be entered into GEO Locate Table 300 since call origination can validate the available system as a potential PRL system. Adding the available system to GEO Locate Table 300 to form Extended GEO Locate Table 700 can have the effect of extending a limited or an out of data provisioned PRL. In this way, MS 106 can possibly violate some rules of limited roaming, therefore, MS 106 can only use the non-PRL systems in the scan list only if MS 106 is configured for roaming. Furthermore, any system not provisioned in PRL 214 added to Extended GEO Locate Table 700 can also contain an associated channel number that can be used while building an optimized scan list.

During a system scan operation, location engine 212 can use device location information dev_loc to index into GEO Locate Table 300 or Extended GEO Locate Table 700 to generate an optimized scan list having matching dev_loc information. The optimized scan list can include at least channel numbers form the PRL associated with the SIDs matching the device location information dev_loc and channel numbers form GEO Locate Table 300 or 700 that are associated with the SIDs matching the device location information dev_loc. It should be noted that if MS 106 is required to enforce limited roaming, the MS 106 can turn off this particular feature.

Figure 8:
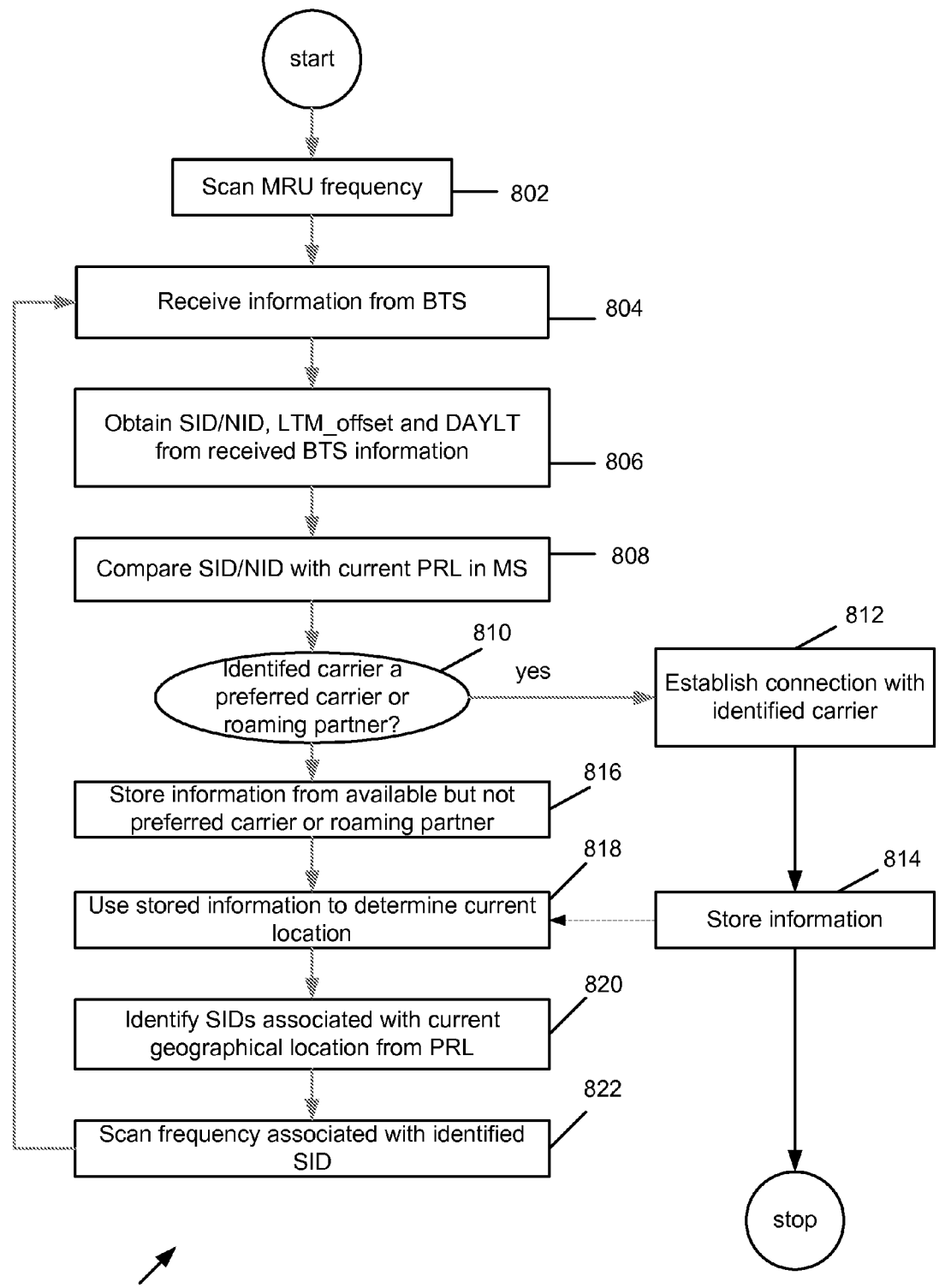
FIGS. 8-13 show flowcharts detailing processes in accordance with the described embodiments.

FIG. 8 shows a flowchart describing process 800 in accordance with the described embodiments. Process 800 can be used to provide an efficient technique for camping on a wireless network operated by a preferred carrier (or a roaming partner). Process 800 can use system information from an available but not preferred system (or not a roaming partner) to determine a reasonably good estimate of a current location of a mobile station, or MS. The mobile station can include system information stored (provisioned) in a data base referred to as a preferred roaming list, or PRL. The PRL can be structured to include specific frequency information associated with particular mobile operators. Process 800 can use the current location of the mobile system to avoid scanning frequencies not associated with a preferred provider or roaming partner.

Accordingly, process 800 can begin at 802 by powering on a mobile system (MS). By powering on it is meant that MS must reacquire access to a wireless network operated by a preferred carrier or a designated roaming partner. Typically, the re-acquisition of access can begin at 804 by the MS scanning a most recently used frequency. Using the most recently used frequency to initiate the search for a current frequency can be based upon the idea that typically the MS was merely turned off or was temporarily disconnected from the wireless network but still remains within the immediate geographical area. Scanning by the MS can include searching for a pilot signal, the pilot signal being broadcast by a base station. In this way, the MS can potentially detect a pilot signal from many base stations of which only a handful can be associated with the preferred wireless network carrier. Once the MS has detected the pilot signal, the MS can receive information from the base station at 804. The MS can decode the pilot signal to obtain information from a sync channel message (SCHM) at 806 that can include such information as a system identifier (SID) and associated network identifier (NID), a local time offset from coordinated UTC (LTM_OFF), and a daylight savings time correction factor (DAYLT).

At 808, a preferred roaming list (PRL) provisioned in the MS can be queried by comparing the SID/NID form the SCHM to those values stored in the PRL. It should be noted that the PRL can take the form of a list of SID/NID, associated frequencies, and corresponding geographical locations, referred to as GEOs, corresponding to particular SIDs. GEO can typically take the form of Mobile Country Codes, or MCCs. At 810, a determination is made whether or not the SID/NID is stored in the PRL as either a preferred carrier or as a roaming parameter. If the SID/NID is determined to be stored in the PRL as a preferred carrier, then at 812, the MS camps on the frequency associated with the base station and store the information at 814. On the other hand, if the SID/NID is not determined to be associated with the preferred carrier or roaming partner, then at 816, the carrier is designated as available (not preferred or roaming) and information provided by the available carrier is stored in the MS. At 818, the stored information is used to determine a current location of the MS. The current location information is then used to SIDs from the PRL at 820. At 822, the MS directly jumps to the identified frequency(ies) skipping over any intervening frequencies. In this way, the amount of time and power consumed in camping on a preferred (or roaming partner) provider can be substantially reduced.

Once the estimate of the current location is known, MS 106 can use the current location information to more effectively query PRL stored in MS 106 jumping directly to only those frequencies associated with the current location. In this way, only those frequencies associated with the current location can be scanned avoiding scanning those frequencies not associated with the current location.

Figure 9:
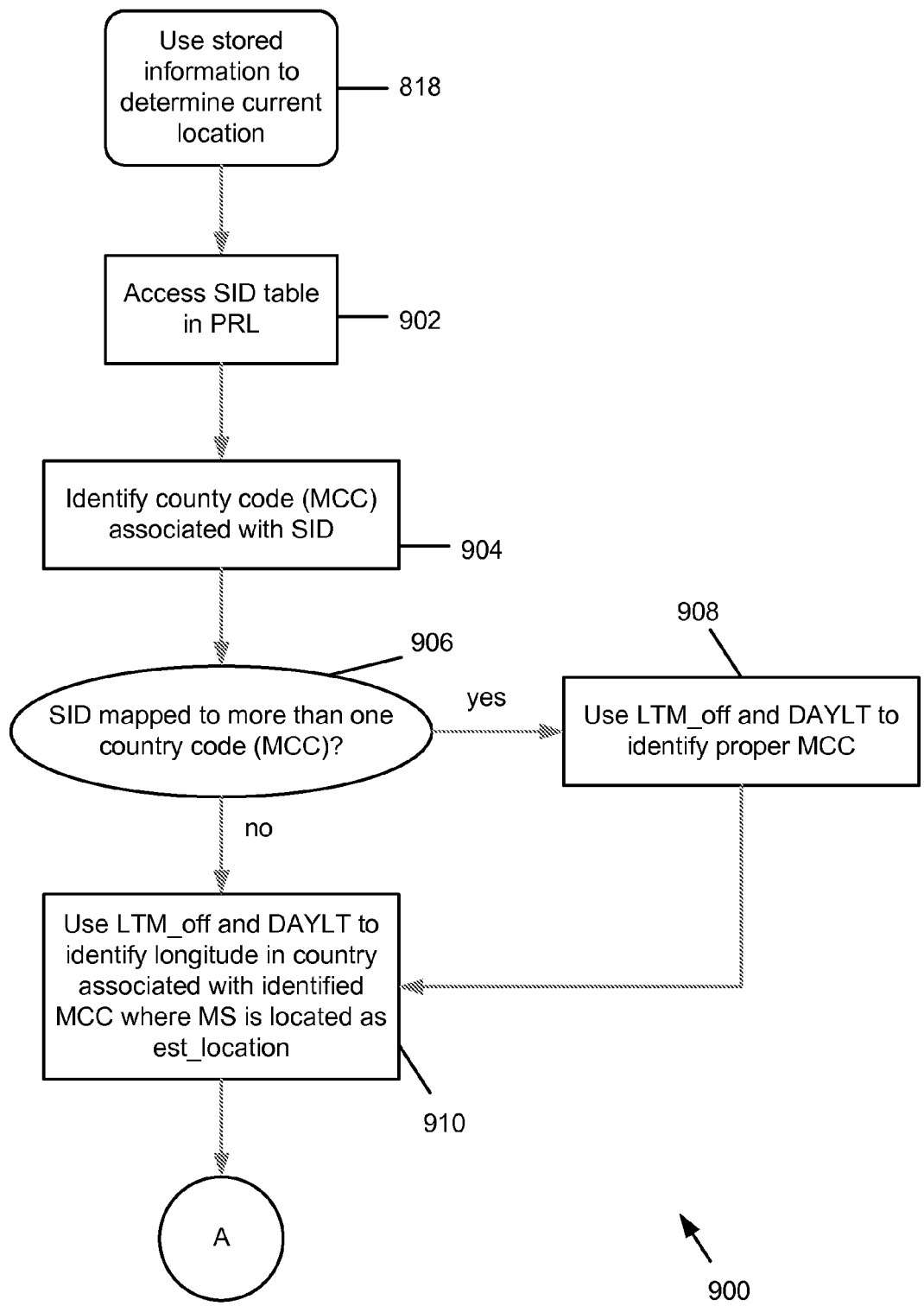

FIG. 9 shows a flowchart detailing process 900 as a particular embodiment of step 818 of process 800. Accordingly, process 900 can be performed by the MS. The MS can use information received from the base station and stored in the MS to determine a current location of the MS. The information received from the base station and stored in the MS can include at least a SID/NID corresponding to the base station. Therefore, at 902, an SID table stored in the MS can be queried using the SID/NID information received from the base station. In the described embodiment, the SID table can include an array of SID values and corresponding Mobile Country Codes, or MCCs. At 904, an MCC corresponding to the received SID is identified. At 906, if the received SID is determined to be mapped to more the one MCC, then at 908, a local time offset value (LTM_OFF) and daylight correction value (DAYLT) obtained from the base station are each used to identify the MCC corresponding to the base station and at 910, the LTM_OFF and DAYLT are used to identify the longitude of the country associated with the identified MCC as est_loc. Returning to 906, if is determined that the SID is not mapped to more than one MCC, then at 912, the proper MCC is identified and at 910, the est_loc is determined as above.

Figure 10:
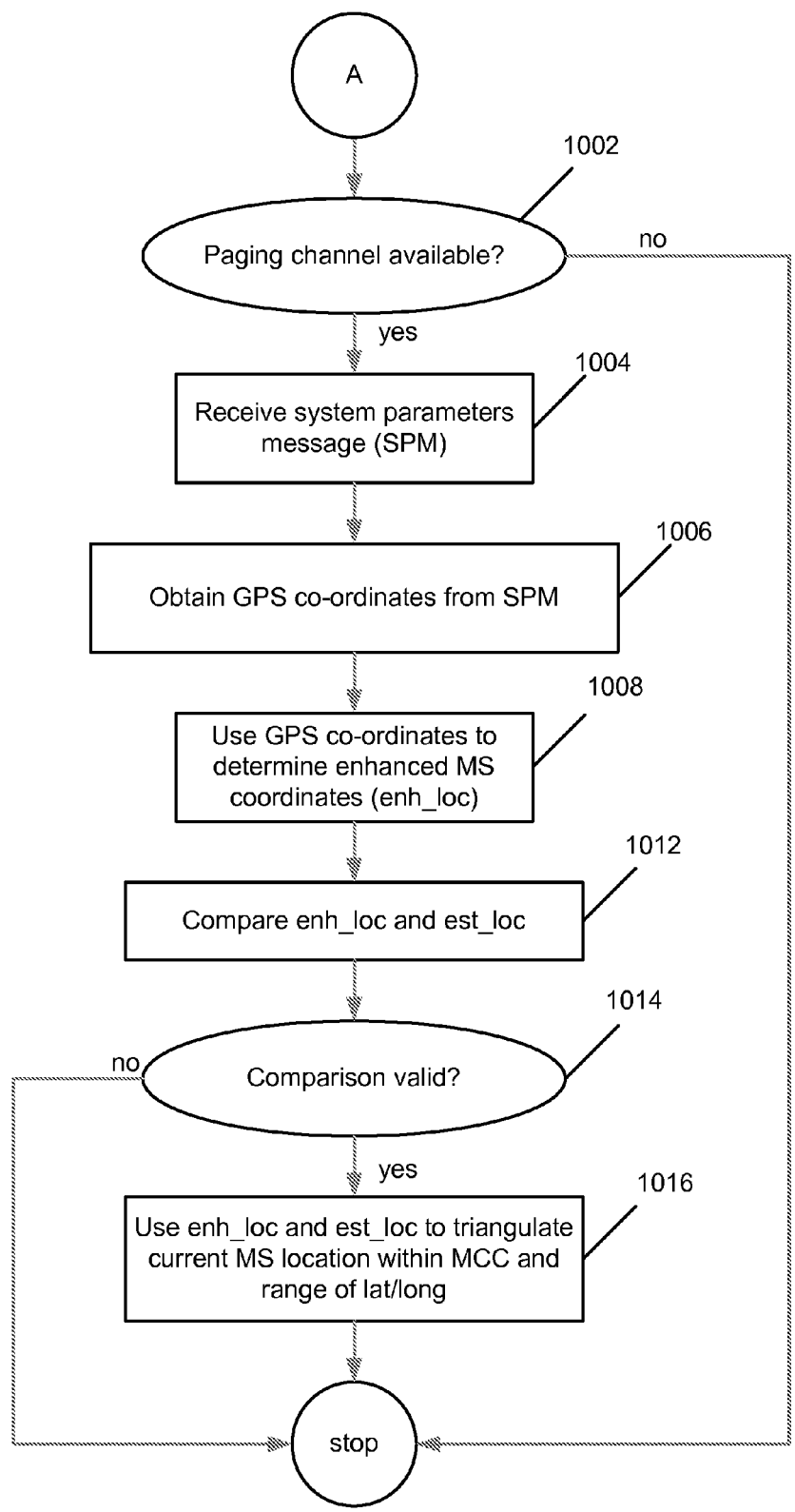

FIG. 10 shows a flowchart detailing process 1000 arranged to provide an enhanced location determination when a paging channel is available. Accordingly, at 1002 if the paging channel is not available, the process 1000 ends, otherwise, at 1004 a system parameters message (SPM) is received as part of the paging channel (PAGECH). The SPM can include GPS co-ordinate data that can include base station longitudinal (BASE_LONG) data and base station latitude (BASE_LAT) data. Therefore, at 1006, GPS co-ordinates data is decoded from the SPM and at 1008, the GPS data is used to determine enhanced coordinate of the MS (referred to as en_loc). By enhanced it is meant that the accuracy of the estimated location can be better than that of est_loc. In order to determine if en_loc is valid, enh_loc is compared to est_loc at 1010 and if the comparison is determined to be valid at 1012, then at 1014 the enh_loc and est_loc are used to triangulate a current range of latitudes/longitudes corresponding to the current location.

Figure 11:
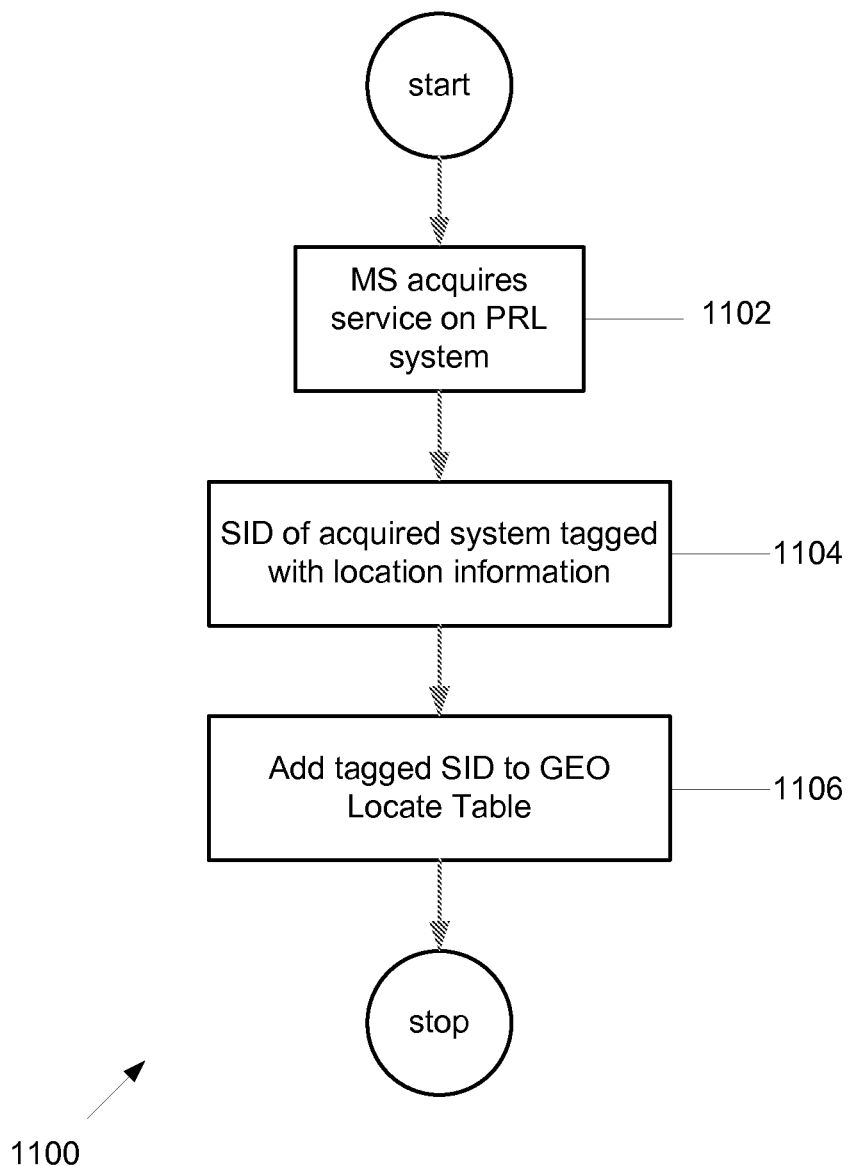

FIG. 11 shows a flowchart detailing process 1100 in accordance with the described embodiments. Process 1100 can be used for updating a GEO Locate Table with device location information, the device location information being used to tag a SID provisioned in a PRL stored in a mobile system. Process 1100 can be carried out by the mobile system (MS) acquiring service on a system provisioned on the PRL. By provisioned on the PRL it is meant that the system identifier (SID) of the acquired system is listed on the PRL. Since the MS was able to acquire the service, the service can be considered available. However, even though the service can be considered available, the service may not be provisioned on the PRL if the service is not a preferred service nor is not a roaming partner. In any case, when the SID of the acquired service is included in the provisioned PRL, then at 1104, the SID associated with the acquired service is tagged with the location information associated with the MS. The location information generated by the location engine based at least in part on information provided by the base station in communication with the mobile system and associated with the acquired service. Next, at 1106, the GEO Locate Table is updated with the tagged SID.

Figure 12:
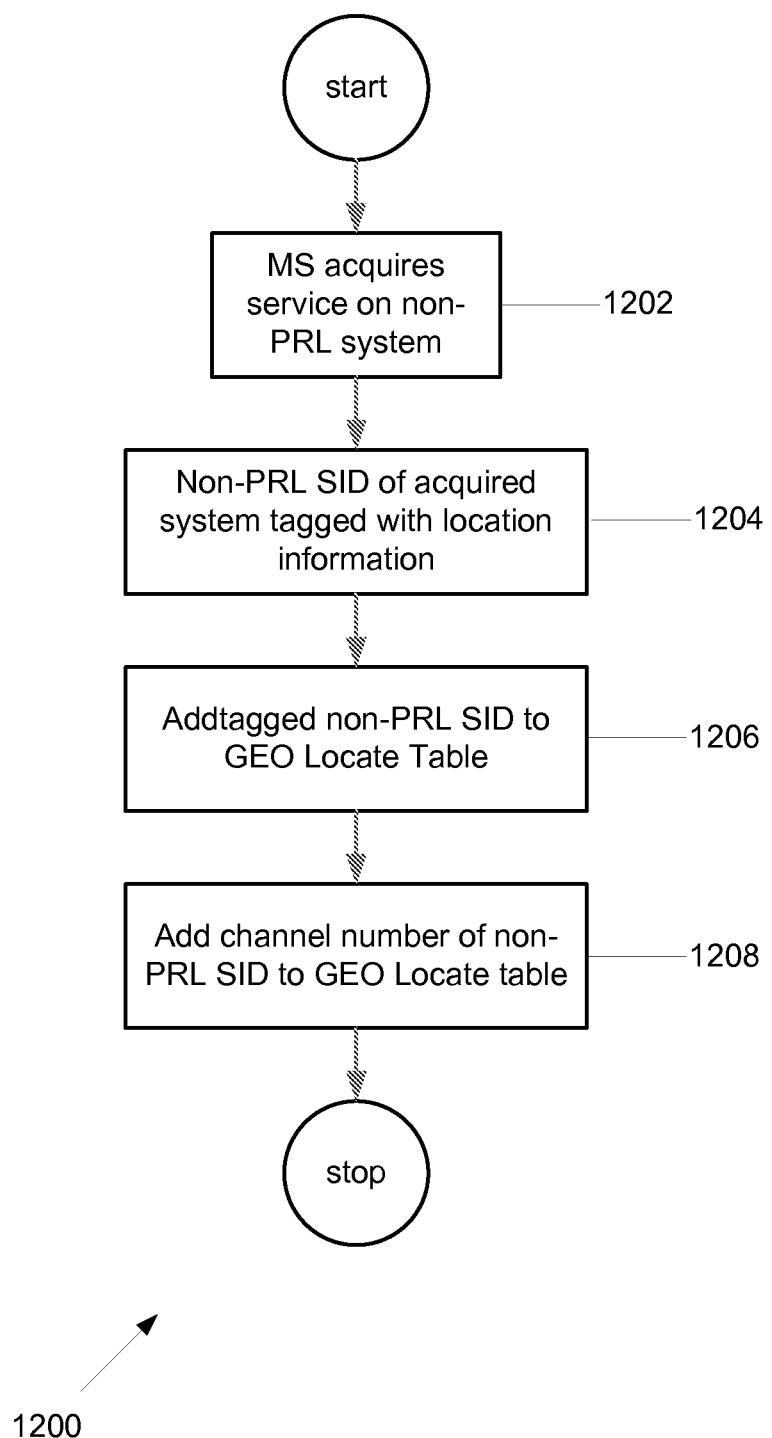

FIG. 12 shows a flowchart detailing process 1200 in accordance with the described embodiments. Process 1200 can be used to update a GEO Locate Table with device location information, the device location information being associated with a system having an SID not provisioned in the PRL. Accordingly, process 1200 can be carried out by the MS acquiring service on a system not provisioned in the PRL at 1202. At 1204, the SID of the system not provisioned in the PRL is tagged with device location information received from the location engine, the device location information associated with the mobile system. Next, at 1206, the tagged non-PRL SID is added to the GEO Locate Table and at 1208, the channel number of the non-PRL SID is added to the GEO Locate Table.

Figure 13:
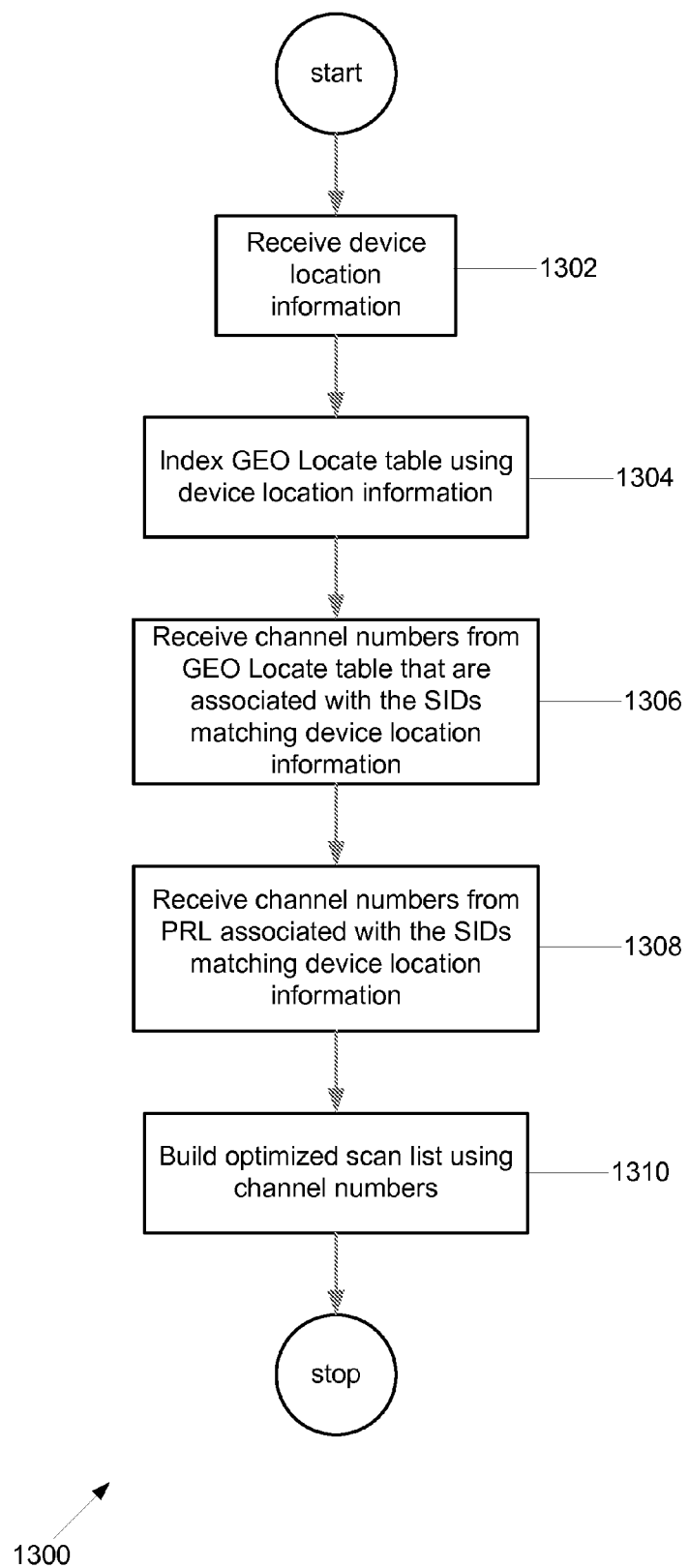

FIG. 13 shows a flowchart detailing process 1300 in accordance with the described embodiments. Process 1300 can be used to generate a scan list optimized for a geographical location of a mobile system. Process 1300 can begin at 1302 by receiving device location information, the device location information can be provided by the location engine included in the mobile system. Next at 1304, the GEO Locate Table is indexed using the device location information. At 1306, a first set of channel numbers are received from the GEO Locate Table. The first set of channel numbers associated with the SIDs in the GEO Locate Table matching the device location information. At 1308, a second set of channel numbers are received from the GEO Locate Table. The second set of channel numbers associated with SIDs from the PRL provisioned in the MS matching the device location information. At 1310, the optimized scan list is generated using the first and second set of channel numbers.

Figure 14:
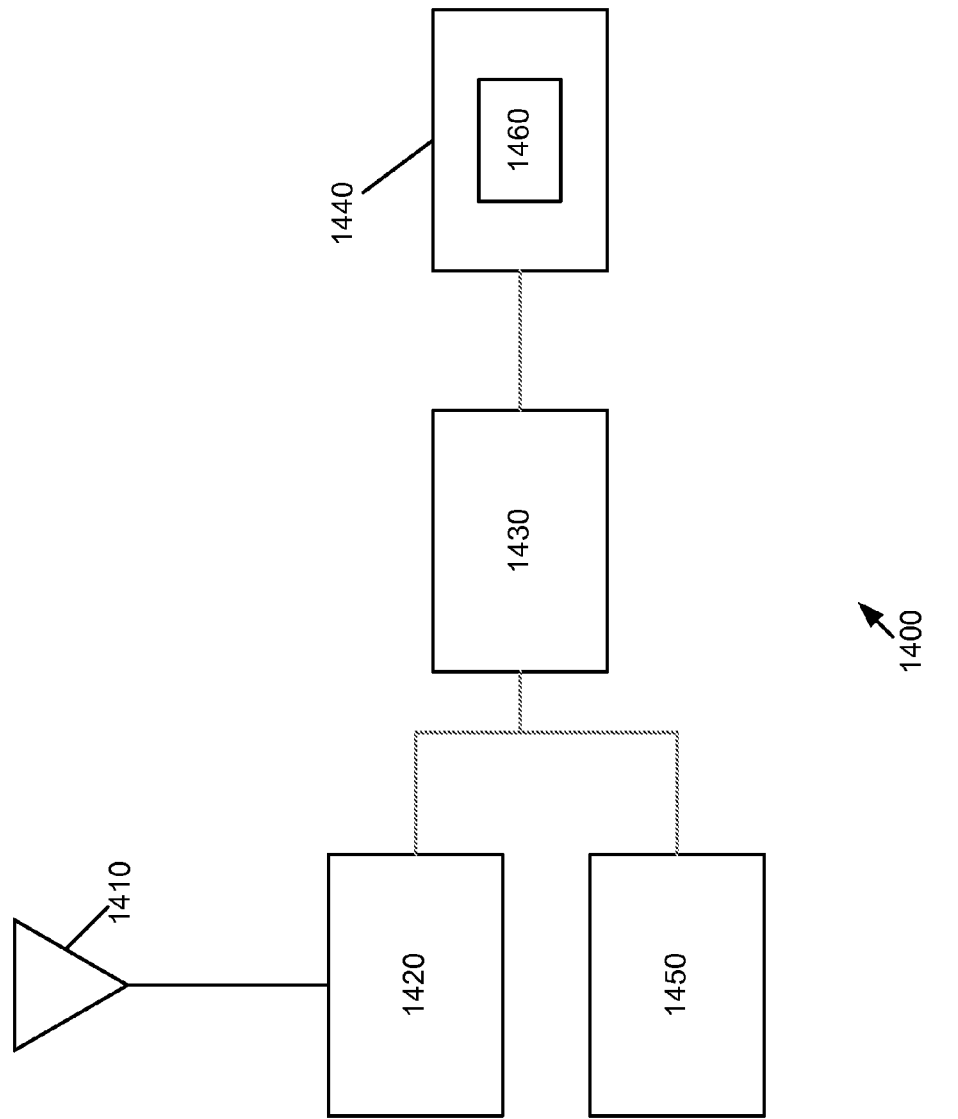
FIG. 14 shows a representative mobile system in accordance with the described embodiments.

FIG. 14 shows an embodiment of mobile unit 1400. For clarity, only a subset of the components is shown. Signals are received at antenna 1410, and delivered to receiver 1420 where amplification, down-conversion, sampling, and demodulating takes place. Various techniques for receiving CDMA signals are known in the art. In addition, the principles of the present invention apply with equal force to wireless communication systems deploying air interfaces other than those based on CDMA. Receiver 1420 is in communication with a central processing unit (CPU) 1430. CPU 1430 may be a microprocessor or digital signal processor (DSP), or one of various processors known in the art. CPU 1430 communicates with memory 1440, which is shown containing roaming list 1460. The roaming list 1460 can be programmed via over-the-air programming in conjunction with antenna 1410 and receiver 1420, or the data for the roaming list may come in from other inputs to CPU 1430 (not shown). CPU 1430 is also connected to transmitter 1450, for transmitting messages, data, voice, etc., using any of the techniques for transmission known in the art. Transmitter 1450 is connected to antenna 1410, for transmission to a base station, such as base station 104. Receiver 1420 and transmitter 1450, in conjunction with antenna 1410, can be used to communicate with one or more systems identified in the roaming list 1460 when the mobile station is roaming.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

The embodiments were chosen and described in order to best explain the underlying principles and concepts and practical applications, to thereby enable others skilled in the art to best utilize the various embodiments with various modifications as are suited to the particular use contemplated. It is intended that the scope of the embodiments be defined by the following claims and their equivalents.

What is claimed is:

1. A method, comprising:
   receiving, at a mobile system, a message from a base station, the message including a system identifier (SID) and time information that identifies the base station;
   estimating a first location of the mobile system based on the time information, the estimated location identifying a location within a country;
   using the estimated first location to identify a preferred system;
   acquiring service associated with the preferred systems;
   associating the acquired service with a geographical region in a locate table, wherein the geographical region is further associated with a range of geographic coordinates;
   subsequent to the estimating of the first location, estimating a second location of the mobile system, wherein the second location is outside of the range of geographic coordinates; and
   updating the range associated with the geographical region to include the second location.

2. The method as recited in claim 1, wherein the geographical region locate table is used to identify the preferred system.

3. The method as recited in claim 1, wherein the geographical region is further associated with a Preferred Roaming List (PRL) indicator indicating that the SID is provisioned in a PRL stored in the mobile system.

4. The method as recited in claim 1, further comprising:
   identifying a second SID associated with the acquired service, wherein the geographical region is associated with the second SID,
   wherein updating the range associated with the geographical region includes updating a range of geographic coordinates associated with the second SID.

5. The method as recited in claim 1, further comprising:
   determining that the SID is not associated with the preferred system, wherein the determination is made by using the geographical region locate table.

6. The method as recited in claim 1, further comprising:
   building a scan list based on channels associated with the geographical region in the geographical region locate table, and
   using the scan list to acquire the preferred system.

7. The method as recited claim 6, further comprising;
   scanning the optimized scan list to acquire access to the preferred system.

8. The method as recited in claim 1, wherein the estimated location includes a geographic coordinate.

9. The method as recited in claim 1, wherein the estimated location includes a range of locations.

10. The method as recited in claim 1, wherein the time information includes a time offset.

11. A wireless mobile system, comprising:
    a wireless interface, the wireless interface configured for wirelessly communication with a wireless base station;
    a memory device, the memory device arranged to store data, the data including at least a preferred roaming list (PRL); and
    a processor, the processor coupled to the wireless interface and the memory device, the processor arranged to:
      access, at a mobile system, a message received from a base station, the message including a system identifier (SID) and time information that identifies the base station;
      estimate a first location of the mobile system based on the time information, the estimated location identifying a location within a country;
      use the estimated first location to identify a preferred system;
      acquire service associated with the preferred system;
      associate the acquired service with a geographical region in a locate table, wherein the geographical region is further associated with a range of geographic coordinates;
      subsequent to the estimating of the first location, estimate a second location of the mobile system, wherein the second location is outside of the range of geographic coordinates; and
      update the range associated with the geographical region to include the second location.

12. The wireless mobile system, as recited in claim 11, wherein the geographical region locate table is used to identify the preferred system.

13. The wireless mobile system, as recited in claim 11, wherein the geographical region is further associated with a Preferred Roaming List (PRL) indicator indicating that the SID is provisioned in a PRL stored in the mobile system.

14. The wireless mobile system, as recited in claim 11, wherein the processor is further arranged to:
    identify a second SID associated with the acquired service, wherein the geographical region is associated with the second SID, wherein updating the range associated with the geographical region includes updating a range of geographic coordinates associated with the second SID.

15. The wireless mobile system, as recited in claim 11, wherein the processor builds a scan list based on channels associated with the geographical region in the geographical region locate table and scans the scan list to acquire access to the preferred system.

16. Non-transitory computer readable medium for storing program code executable by a processor in a wireless mobile system in a wireless communication network, comprising:
   computer code for receiving, at a mobile system, a message from a base station, the message including a system identifier (SID) and time information that identifies the base station;
   computer code for estimating a first location of the mobile system based on the time information, the estimated location identifying a location within a country;
   computer code for using the estimated first location to identify a preferred system;
   computer code for acquiring service associated with the preferred system;
   computer code for associating the acquired service with a geographical region in a locate table, wherein the geographical region is further associated with a range of geographic coordinates;
   computer code for, subsequent to the estimating of the first location, estimating a second location of the mobile system, wherein the second location is outside of the range of geographic coordinates; and
   computer code for updating the range associated with the geographical region to include the second location.

17. The computer readable medium as recited in claim 16, wherein the geographical region locate table is used to identify the preferred system.

18. The computer readable medium as recited in claim 16, wherein the geographical region is further associated with a Preferred Roaming List (PRL) indicator indicating that the SID is provisioned in a PRL stored in the mobile system.

19. The computer readable medium as recited in claim 16, further comprising:
   computer code for identifying a second SID associated with the acquired service, wherein the geographical region is associated with the second SID,
   wherein updating the range associated with the geographical region includes updating a range of geographic coordinates associated with the second SID.

20. The computer readable medium as recited in claim 16, further comprising:
   computer code for building a scan list based on channels associated with the geographical region in the geographical region locate table, and
   computer code for using the scan list to acquire the preferred system.

21. The computer readable medium as recited claim 16, further comprising;
   computer code for determining that the SID is not associated with the preferred system, wherein the determination is made by using the geographical region locate table.

22. A wireless network, comprising:
   a base station; and
   a mobile system, wherein the mobile system is configured to:
      access, at a mobile system, a message received from a base station, the message including a system identifier (SID) and time information that identifies the base station;
      estimate a first location of the mobile system based on the time information, the estimated first location identifying a location within a country;
      use the estimated first location to identify a preferred system;
      acquire service associated with the preferred system;
      associate the acquired service with a geographical region in a locate table, wherein the geographical region is further associated with a range of geographic coordinates;
      subsequent to the estimating of the first location, estimate a second location of the mobile system, wherein the second location is outside of the range of geographic coordinates; and
      update the range associated with the geographical region to include the second location.

23. The wireless network as recited in claim 22, wherein the geographical region locate table is used to identify the preferred system.

24. The wireless network as recited in claim 23, wherein the geographical region is further associated with a Preferred Roaming List (PRL) indicator indicating that the SID is provisioned in a PRL stored in the mobile system.

25. The wireless network as recited in claim 23, wherein the mobile system is further configured to identify a second SID associated with the acquired service, wherein the geographical region is associated with the second SID, wherein updating the range associated with the geographical region includes updating a range of geographic coordinates associated with the second SID.

26. The wireless network as recited in claim 23, wherein the mobile device builds a scan list based on channels associated with the geographical region in the geographical region locate table, uses the scan list to acquire the preferred system and scans the optimized scan list to acquire access to the preferred system.

\* \* \* \* \*

UNITED STATES PATENT AND TRADEMARK OFFICE
CERTIFICATE OF CORRECTION

PATENT NO.            : 8,929,888 B2                                    Page 1 of 1
APPLICATION NO.       : 13/110836
DATED                 : January 6, 2015
INVENTOR(S)           : Bharath Narasimha Rao et al.

It is certified that error appears in the above-identified patent and that said Letters Patent is hereby corrected as shown below:

In the claims:

Column 13, Line 47, Claim 1: please delete "location" and insert --first location--.
Column 13, Line 51, Claim 1: delete "systems" and insert --system--.
Column 13, Lines 62 & 63, Claim 2: delete "geographical region".
Column 14, Line 11, Claim 5: delete "geographical region".
Column 14, Line 14, Claim 6: delete second occurrence of "geographical region".
Column 14, Line 18, Claim 7: delete "optimized".
Column 14, Line 39, Claim 11: delete "location" and insert --first location--.
Column 14, Line 55, Claim 12: delete "geographical region".
Column 15, Line 6, Claim 15: delete second occurrence of "geographical".
Column 15, Line 7, Claim 15: delete "region".
Column 15, Line 18, Claim 16: delete "location" and insert --first location--.
Column 15, Line 34, Claim 17: delete "geographical region".
Column 15, Lines 51 & 52, Claim 20: delete "geographical region".
Column 16, Line 7, Claim 21: delete "geographical region".
Column 16, Line 34, Claim 23: delete "geographical region".
Column 16, Line 51, Claim 26: delete "optimized".

Signed and Sealed this
Thirty-first Day of March, 2015

Michelle K. Lee
*Director of the United States Patent and Trademark Office*